United States Patent
Bai et al.

(10) Patent No.: US 9,336,495 B2
(45) Date of Patent: May 10, 2016

(54) QUERY GENERATION AND TIME DIFFERENCE FEATURES FOR SUPERVISED SEMANTIC INDEXING

(71) Applicant: NEC Laboratories America, Inc., Princeton, NJ (US)

(72) Inventors: Bing Bai, Princeton Junction, NJ (US); Christopher Malon, Fort Lee, NJ (US); Iain Melvin, Rocky Hill, NJ (US)

(73) Assignee: NEC Corporation (JP)

( * ) Notice: Subject to any disclaimer, the term of this patent is extended or adjusted under 35 U.S.C. 154(b) by 272 days.

(21) Appl. No.: 14/064,949

(22) Filed: Oct. 28, 2013

(65) Prior Publication Data

US 2014/0122388 A1    May 1, 2014

Related U.S. Application Data

(60) Provisional application No. 61/719,474, filed on Oct. 28, 2012.

(51) Int. Cl.
*G06N 99/00* (2010.01)
*G06F 17/30* (2006.01)

(52) U.S. Cl.
CPC ........ *G06N 99/005* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 8,600,809 B1* | 12/2013 | Kubica | .................. | G06Q 30/02 705/14.41 |
| 2002/0052873 A1* | 5/2002 | Delgado | ........... | G06F 17/30864 |
| 2010/0076949 A1* | 3/2010 | Zoeter | ............... | G06F 17/30864 707/706 |
| 2010/0169244 A1* | 7/2010 | Zeljkovic | ............ | G06F 17/3071 706/12 |
| 2011/0270604 A1* | 11/2011 | Qi | ......................... | G06F 17/271 704/9 |
| 2012/0265756 A1* | 10/2012 | Ryan | ................. | G06F 17/30864 707/725 |

OTHER PUBLICATIONS

Taesup Moon, Lihong Li, Wei Chu, Ciya Liao, Zhaohui Zheng, Yi Chang, Online learning for recency search ranking using real-time user feedback, Proceedings of the 19th ACM international conference on Information and knowledge management, Oct. 26-30, 2010, Toronto, ON, Canada.*

Bai, B., et al. "Learning to Rank With (a Lot of) Word Features" Journal Information Retrieval. vol. 13, No. 3. Jun. 2010. pp. 291-314.

Bai, B., et al. "Polynomial Semantic Indexing" 23rd Annual Conference on Neural Information Processing Systems. Dec. 2009. pp. 1-9.

Bai, B., et al. "Half Transductive Ranking" Proceedings of the Thirteenth International Conference on Artificial Intelligence and Statistics, vol. 9. Mar. 2010. (8 Pages).

Manning, C. D., et al. "Introduction to Information Retrieval" Cambridge University Press, 2008. pp. 177-194; p. 187.

* cited by examiner

*Primary Examiner* — Stanley K Hill
*Assistant Examiner* — David H Kim
(74) *Attorney, Agent, or Firm* — Joseph Kolodka

(57) ABSTRACT

Semantic indexing methods and systems are disclosed. One such method is directed to training a semantic indexing model by employing an expanded query. The query can be expanded by merging the query with documents that are relevant to the query for purposes of compensating for a lack of training data. In accordance with another exemplary aspect, time difference features can be incorporated into a semantic indexing model to account for changes in query distributions over time.

9 Claims, 8 Drawing Sheets

US 9,336,495 B2

QUERY GENERATION AND TIME DIFFERENCE FEATURES FOR SUPERVISED SEMANTIC INDEXING

RELATED APPLICATION INFORMATION

This application claims priority to provisional application Ser. No. 61/719,474 filed on Oct. 28, 2012, incorporated herein by reference in its entirety.

BACKGROUND

1. Technical Field

The present invention relates to semantic indexing, and, more particularly, to reducing ranking errors in semantic indexing systems and methods.

2. Description of the Related Art

Supervised Semantic Indexing (SSI) models are trained using a set of queries and documents regarded as good matches for the queries. There are several practical challenges that arise when applying this scheme. In particular, there are many sources of ranking errors that can affect the performance of the model. For example, two substantial problems that can cause ranking errors are a lack of training data and changes in the distribution of queries over time. Here, a lack of training data can cause the model to overfit the data. In addition, changes in query distributions may render the SSI model obsolete for new data.

SUMMARY

One embodiment of the present invention is directed to a method for training a semantic indexing model. In accordance with the method, a search engine is provided with a first query. In addition, a set of documents of a plurality of documents related to the first query is received from the search engine. Further, an expanded query is generated by merging at least a portion of a subset of the set of documents with the first query. Additionally, the semantic indexing model is trained based on the expanded query.

Another embodiment of the present invention is directed to a method for incorporating a time-based measure in a semantic indexing model. In accordance with the method, a query is received. At least one time difference parameter denoting a time difference between receipt of the query and a generation of at least one document of a plurality of documents is determined. In addition, a similarity measure is modified based on the time difference parameter(s). Further, at least a subset of the plurality of documents are ranked based on the modified similarity measure.

Another embodiment of the present invention is directed to a system for training a semantic indexing model. The system includes a search engine, a query generator unit and a controller. The search engine is configured to receive a first query and generate a set of documents of a plurality of documents related to the first query. In addition, the query generator unit is configured to generate an expanded query by merging at least a portion of at least a subset of the set of documents with the first query. Further, the controller is configured to train the semantic indexing model based on the expanded query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
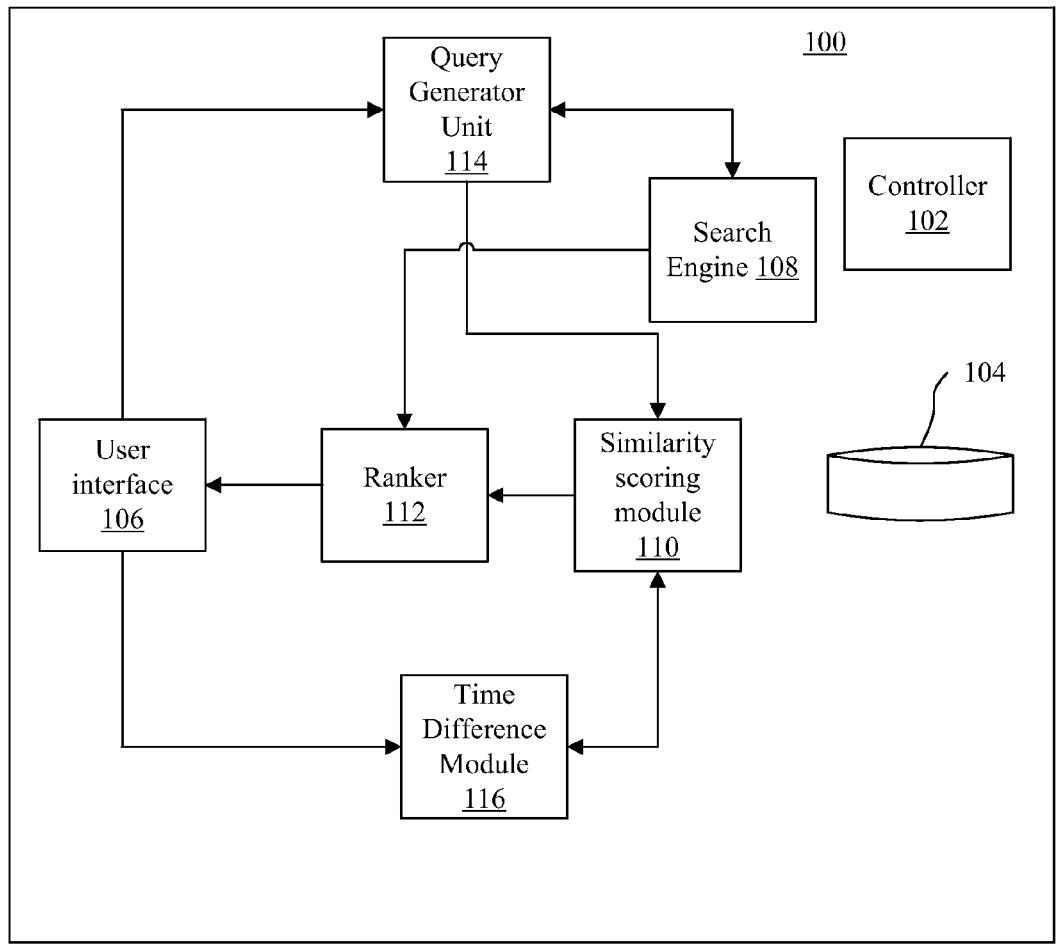
FIG. 1 is a high-level block/flow diagram of a semantic indexing system in accordance with an exemplary embodiment of the present invention.

Exemplary embodiments of the present invention described herein improve SSI ranking methods and systems by compensating for a lack of training data and implementing time difference features to address changes in the distribution of queries over time. To compensate for a lack of training data, query terms can be expanded with the top N relevant documents/items of a search engine, and SSI models can be trained using these expanded query vectors. Here, when expanding query terms, normalization may apply. To address shifting of queries over time, a time feature is introduced. In particular, the time feature can denote the difference between the time the query is generated and the time when a document is generated. In preferred embodiments, this time feature can be used in training and testing to bias newer documents over older documents.

It should be understood that embodiments described herein may be entirely hardware or may include both hardware and software elements, which includes but is not limited to firmware, resident software, microcode, etc. In a preferred embodiment, the present invention is implemented in hardware and software.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, an exemplary SSI system 100 in accordance with an exemplary embodiment is illustratively depicted. The system 100 includes a user interface 106, a search engine 108, a similarity scoring module 110, a ranker 112 and a time difference module 116. Each of these elements can be implemented and/or controlled by a controller 102 utilizing a storage medium 104, which can store software instructions that are performed by the controller 102, and/or any of the other elements of the system 100, and can store various data employed by the system elements to perform their respective functions. To enable ease of understanding, exemplary functions of various elements of the system 100 are described herein below with respect to method embodiments.

Figure 2A:
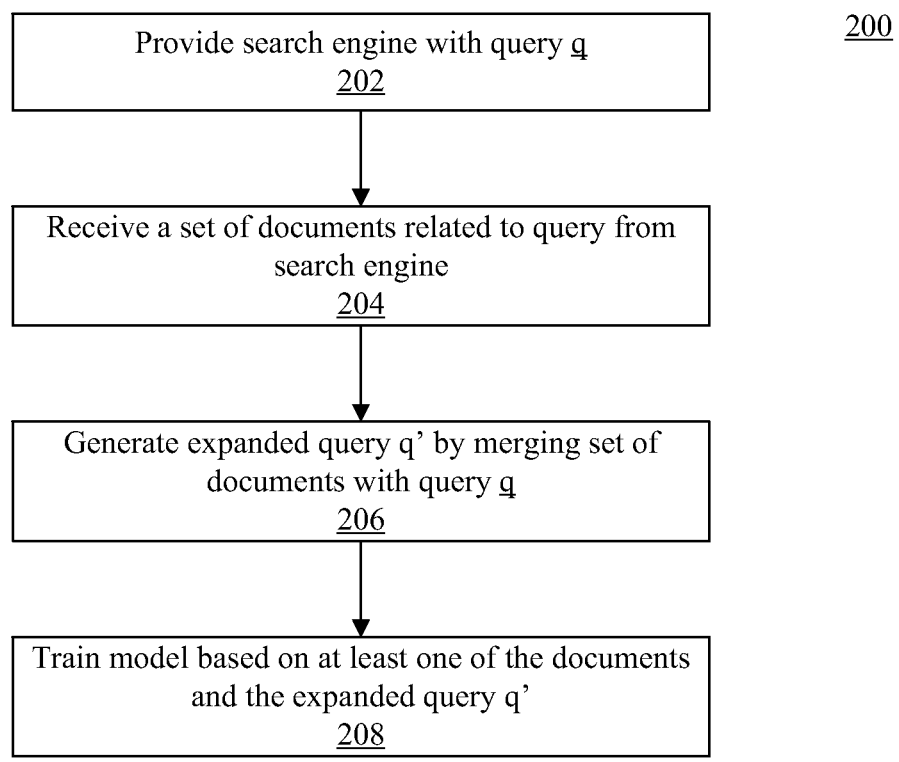
FIG. 2A is a high-level block/flow diagram of a method for training a semantic indexing model in accordance with an exemplary embodiment of the present invention.

With reference to FIG. 2A, with continuing reference to FIG. 1, a method 200 for training an SSI model by expanding query terms in accordance with an exemplary embodiment of the present invention is illustratively depicted. It should be noted that the system 100 can be configured to learn to rank documents for queries by minimizing the following margin rank loss:

$$\sum_{(q,d^+,d^-)} \max(0, 1 - f(q, d^+) + f(q, d^-)) \quad (1)$$

where q is a word vector of the query $\underline{q}$, $d^+$ is a word vector of relevant documents $\underline{d}^+$, $d^-$ is a word vector irrelevant documents $\underline{d}^-$, and $f$ is a similarity function between a query and documents. A word vector, such as q, $d^+$ or $d^-$, is a vector of D, where D is the size of a vocabulary. Each word (term) is assigned a fixed position in this vector, and the value at that position in the vector would be the weight of the word in that text entity, which is either a query or a document. This representation is a "vector space model" in which the similarity of two text entities can be calculated by the dot product of their word vectors. Here, the text entities are denoted as underlined letters, such as $\underline{q}$ for query or $\underline{d}$ for document, and their word vectors are denoted as italic letters, such as q for query $\underline{q}$ or d for $\underline{d}$. The similarity function $f$ can be a low rank linear model on pairwise features, among other functions and can be determined by solving the optimization problem of equation (1). In accordance with exemplary embodiments, the similarity function can be $f(q,d)=q^T U^T U d$, $f(q,d)=q^T U^T V d$, a or other functions. Thus, the system ranks documents based on scores provided by the similarity function $f$ between words of a query $\underline{q}$ and a given document $\underline{d}$, where the documents $\underline{d}$ with the highest scores for the query $\underline{q}$ are given the highest rankings. As discussed further herein below, the query feature q, which is orthogonal to exploring similarity measures, is modeled and expanded. In particular, the preferred embodiments of the ranker 112 rank documents for a query q' based on the similarity function $f$, where $f$ is determined such that the following loss is minimized:

$$\sum_{(q,d^+,d^-)} \max(0, 1 - f(q', d^+) + f(q', d^-)), \quad (2)$$

where $q'$ is an expanded query for $q$

In accordance with one exemplary aspect, the controller 102 can solve the optimization problem (2) by applying a Stochastic Gradient Descent on $\{(q, d^+, d^-)\}$, or on its subset.

To generate and apply the expanded query q', the method 200 can begin at step 202, at which the system 100 can receive a query $\underline{q}$ through the user-interface 106 from a user and can provide the query $\underline{q}$ to the search engine 108.

At step 204, the query generator 114 can receive a set of documents related to the query $\underline{q}$. For example, the search engine 108 can apply an existing searching algorithm to obtain a set of documents that are relevant to the query $\underline{q}$. Here, the query generator 114 can select a set S of the top k documents $\{\underline{d}_1, \underline{d}_2, \ldots, \underline{d}_k\}$, where k is a pre-defined parameter (e.g., k=5).

At step 206, the query generator unit 114 can generate a new query q' by merging at least a subset S of the received set of documents with the query $\underline{q}$. For example, the query generator 114 can merge words in S with $\underline{q}$ to generate the new q'. The merging can be implemented by merging the text of query $\underline{q}$ with the text of documents in S and calculating the weight vector on the resulting text as q'. Alternatively, the query generator 114 can calculate the word weights separately on $\underline{q}$ and S, average the weights, and then set q' as the average. In each of these cases, to calculate the word weights, the query generator 114 can use a binary representation, where, for example, the component of the vector is populated with a 1 when the word occurs, 0 otherwise. In addition, the query generator 114 can utilize term frequency (TF), term frequency-inverse document frequency (TF-IDF), OKAPI BM25, etc. Other methods for generating a new query q' by merging the set S of documents with the query $\underline{q}$ can also be employed.

Figure 3:
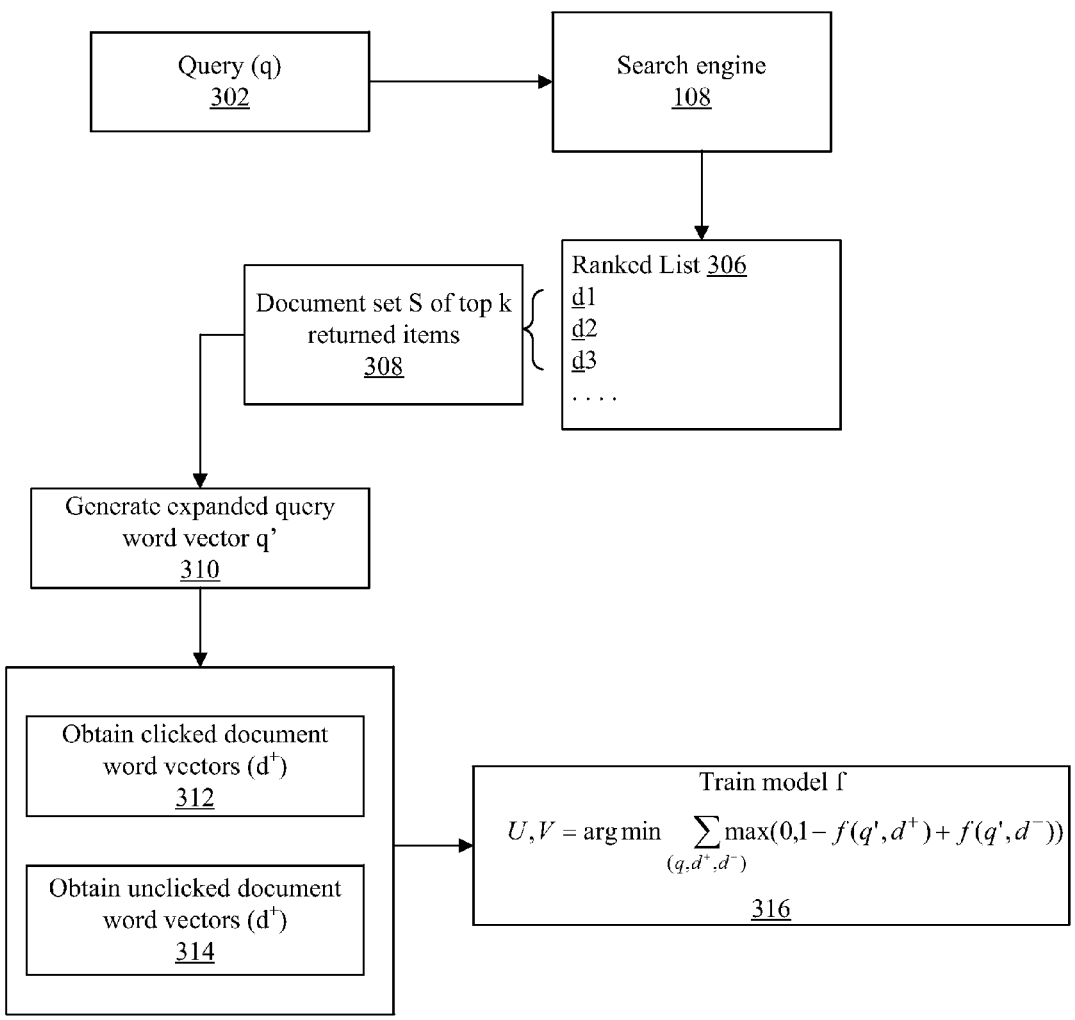
FIG. 3 is a high-level block/flow diagram illustrating an exemplary implementation of the method of FIG. 2A.

At step 208, the controller 102 can train the SMI model $f$ based on at least one of the documents and the expanded query q'. For example, FIG. 3 illustrates one implementation of the method 200. Here, the query 302 can be provided to the search engine 108, as described above with respect to step 202. In addition, the search engine 108 can output a ranked list 306 and the query generator 114 can determine a set S of the top k returned items 308, as discussed above with respect to step 204. At block 310, the query generator 114 can generate an expanded query word vector q', as discussed above with respect to step 206. At blocks 312 and 314, which can be implemented at step 208, the controller 102 can obtain clicked document word vectors $d^+$ and unclicked document word vectors $d^-$. For example, the controller 102 can output the ranked list 306 provided by the search engine 108 through the user interface 106. In turn, word vectors of any documents clicked by the user are set by the controller 102 as $d^+$, while word vectors for any documents that were presented and not clicked by the user are set by the controller 102 as $d^-$. Based on the word vectors q', $d^+$ and $d^-$, the controller 102, at block 316, which can be implemented at step 208, can train the model $f$. For example, the controller 102 can determine parameters U,V of the model $f$ by solving the following optimization problem as discussed above:

$$U, V = \operatorname*{argmin} \sum_{(q,d^+,d^-)} \max(0, 1 - f(q', d^+) + f(q', d^-)).$$

Figure 2B:
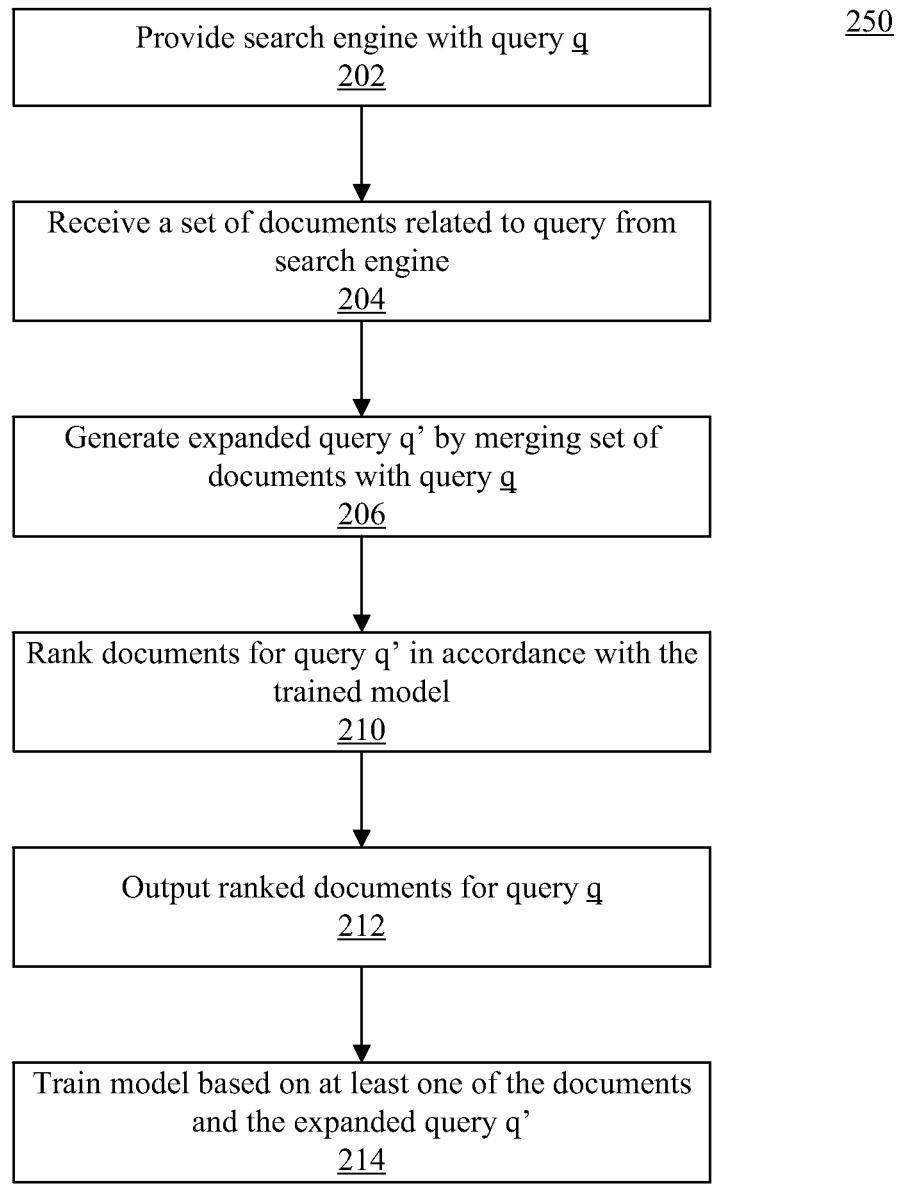
FIG. 2B is a high-level block/flow diagram of a method for applying a trained semantic indexing model in accordance with an exemplary embodiment of the present invention.

After the system 100 is trained, at least to some degree, in accordance with the method 200, the system 100 can perform the method 250 of FIG. 2B to apply the learned model $f$. Here, steps 202-206 can be performed as discussed above with respect to the method 200. However, the query q need not be the same as the query q applied in the method 200.

Figure 4:
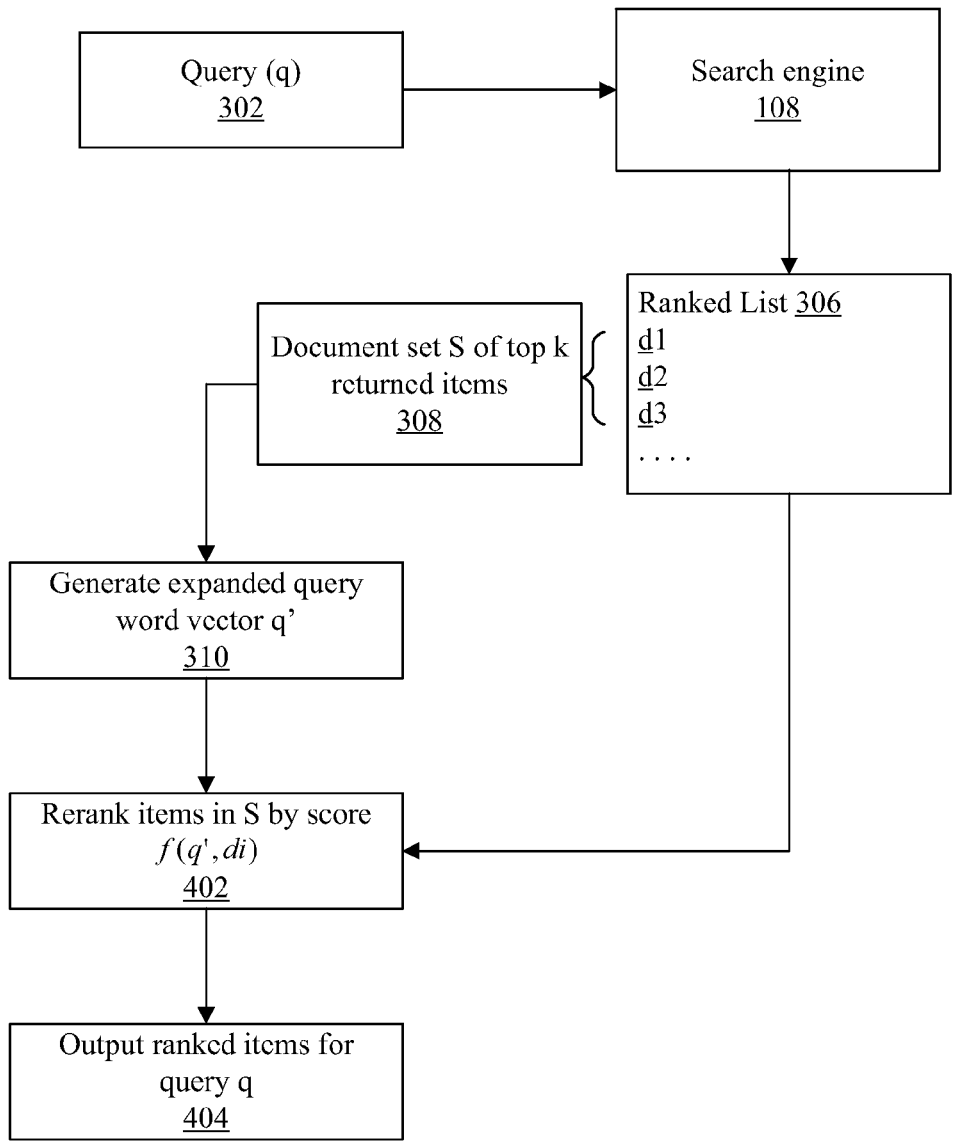
FIG. 4 is a high-level block/flow diagram illustrating an exemplary implementation of the method of FIG. 2B.

At step 210, the ranker 112 can rank documents for the query q' in accordance with the trained model $f$. For example, to better illustrate how step 210 can be implemented, reference is made to FIG. 4. Here, the ranked list 306 can be output as discussed above and the document set S can be determined at block 308 as discussed above. Further, at block 310, the query generator 114 can generate the expanded query word vector q' as discussed above with respect to FIG. 3. At block 402, the similarity scoring module 110 can recalculate the similarity score $f$(q', di) using the query word vector q' and, based on the similarity score $f$(q', di), the ranker 112 can re-rank the documents in set 306 and thereby generate a set S'. For example, the ranker 112 ranks documents based on scores provided by the similarity function $f$ between words of a query q' and a given document d, where the documents d with the highest scores for the query q are given the highest rankings. The ranker 112 may then output the set S' through the user interface 106 at block 404, which can be implemented at step 212 of the method 250. Thus, in response to receiving the query q from a user through the user interface 106, the system re-ranks the items provided by the search engine 108 using the expanded query q' and the trained model $f$.

The method can also proceed to step 214, where the controller 102 can continue training the model as discussed above with respect to step 208 of the method 200. For example, after the ranked set S' is output to the user, the controller 102 can monitor the documents that were clicked by the user and also the documents that were presented to the user and not clicked by the user to update the parameters U, V of the model $f$, as discussed above with respect to step 208. Thereafter, the method 200 can repeat with a different query q entered by the user.

It should be noted that the methods 200 and 250 can be implemented in a variety of ways. For example, with regard to step 204, the top returned items $\{d_1, d_2, \ldots, d_k\}$ that are merged with the query at step 206 can be obtained from a search engine, as discussed above. Alternatively, the top returned items can be selected by applying a cosine distance between the query vector q and the document vectors of various available stored documents, where the k document vectors with the closest cosine differences are selected as the top returned items. Here, query vectors and document vectors can be calculated, for example, by TFIDF, OKAPI BM25, or simply word counts. In accordance with another exemplary aspect, the top returned items can be selected by using the cosine distance between the query vectors and a low rank representation of documents, where the representations are obtained by applying singular value decompositions (SVD), principal component analysis (PCA), etc. to the documents. The k document representations with the closest cosine differences are selected as the top returned items that are merged with the query q at step 206. In another embodiment, the top returned items can simply be single words that have the highest similarity with one of the query terms of the query q, where the merging comprises merging single words of the document vectors with query words of the query q that are similar to the document words. The similarity between terms can be calculated by co-occurrence based measures, such as dice score, mutual information, etc. Alternatively, the similarity between terms can be calculated by cosine distance between embedding vectors of the words. Embeddings can be generated by factor analysis models like SVD, PCA or supervised embeddings.

Further, in accordance with other exemplary aspects of the present invention, the expansion procedure at step 206 can be performed by summing up the normalized TFIDF weights for query terms and the terms in the top k documents, and normalizing the resulting vector to have norm 1. Alternatively, the query generator 114 can calculate the normalized TFIDF on the concatenated text of the query and the top k documents.

As noted above, exemplary embodiments of the present invention can implement time difference features to address changes in the distribution of queries over time. This aspect is important for several reasons. For example, technical support documents for certain products lose value when these products are obsolete. Including these documents during training of models simply introduces noise and reduces the quality of rankings. However, newly created documents are more likely to be reused because they are often associated with popular new products. Thus, a "time difference" feature should be introduced into the similarity function. Specifically, preferred embodiments of the present invention employ the variable TimeDiff (q,d)=time (q)–time(d), which is the difference between the time when the query q is generated, time(q), and the time when a document was generated/updated, time(d).

Figure 5:
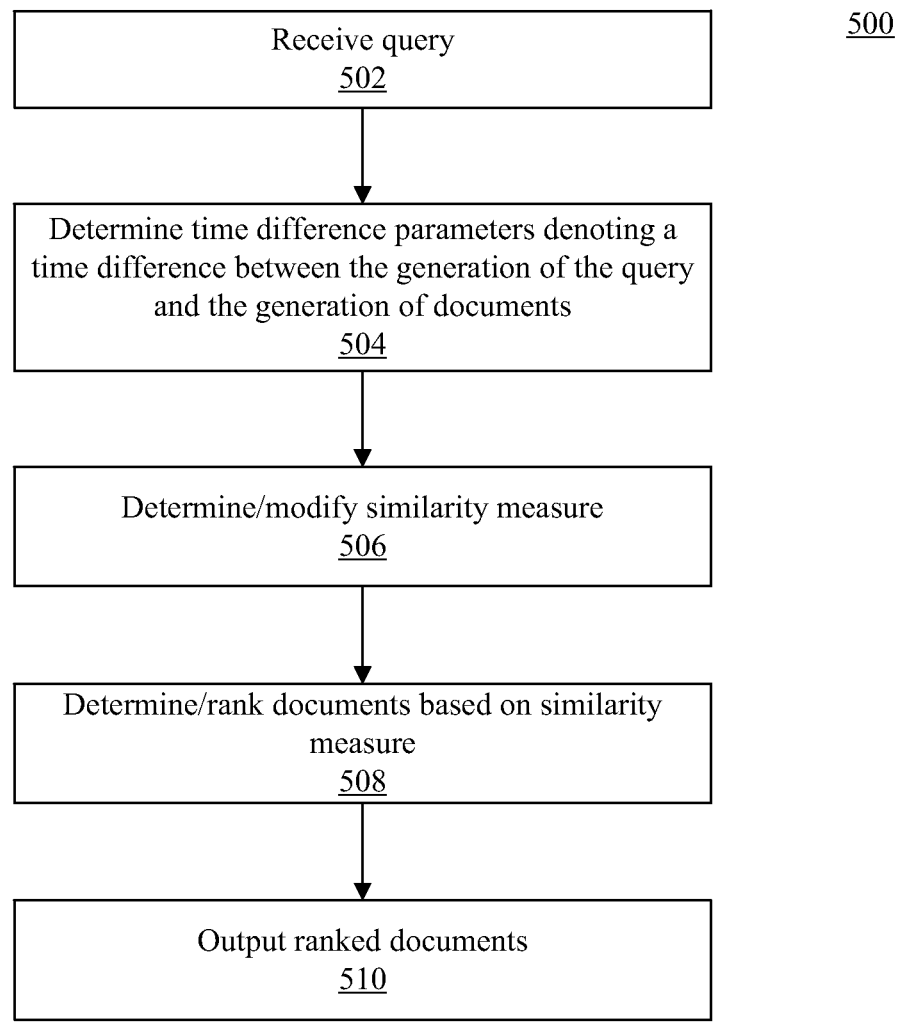
FIG. 5 is a high-level block/flow diagram of a method for incorporating a time-based measure in a semantic indexing model in accordance with an exemplary embodiment of the present invention.

With reference now to FIG. 5, a method 500 for semantic indexing that incorporates a time difference feature in accordance with an exemplary embodiment of the present invention is illustratively depicted. The method 500 can begin at step 502, at which the system 100 can receive a query q at step 502 through the user interface 106.

At step 504, the time difference module 116 can determine one or more time difference parameters denoting a time difference between the generation of the query and the generation of documents. For example, for each document d stored in the system, the time difference module 116 can determine the time difference TimeDiff (q,d)=time(q)–time(d). Here, the time of the generation of the query can be the time that the query is received by the system 100 and the time of the generation of a document can be the time that the document is first stored in the system 100 or the time at which the document was most recently updated.

Figure 6:
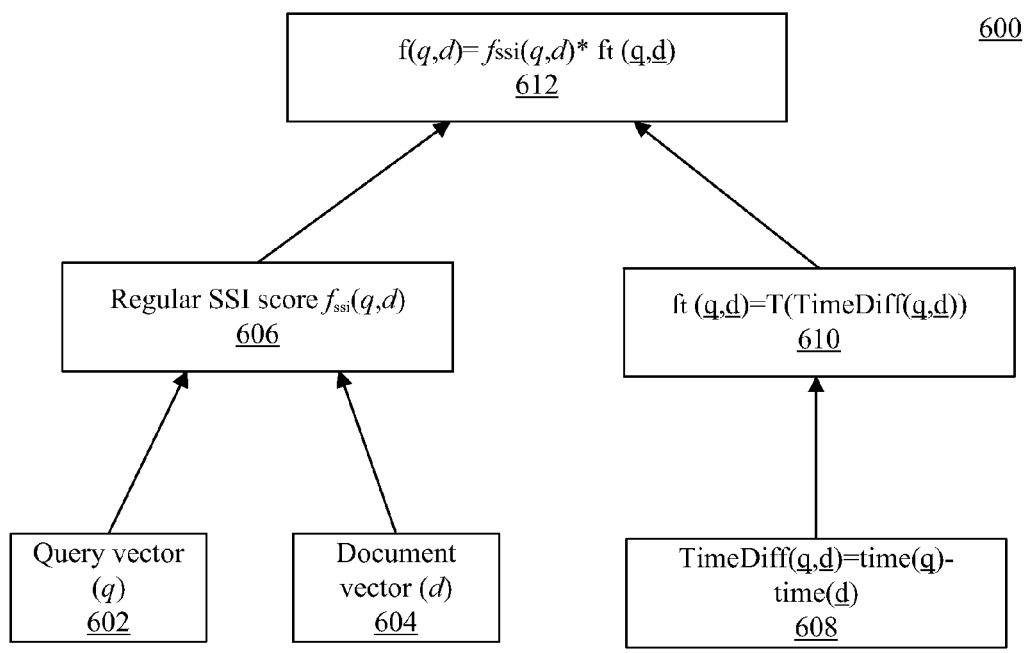
FIG. 6 is a high-level block/flow diagram illustrating aspects of an exemplary implementation of the method of FIG. 5.

At step 506, the similarity scoring module 110 can determine/modify a similarity measure based on the time difference parameter(s). For example, the variable could be used at step 506 as a reweighting factor on the original SSI score, i.e., $f(q,d)=f_{ssi}(q,d)*TimeDiff(\underline{q},\underline{d})$. For example, with reference to the diagram 600 of FIG. 6, a query vector q 602 and a document vector d 604 can be employed by the similarity scoring module 110 to determine an SSI score $f_{ssi}(q,d)$, as discussed above. In addition, the time difference module 116 can employ the time difference TimeDiff($\underline{q},\underline{d}$) to determine a time difference weighting factor ft($\underline{q},\underline{d}$)=T(TimeDiff($\underline{q},\underline{d}$)) at block 610. Further, at block 612, the similarity scoring module 110 can weight the similarity score f(q,d) between vectors q and d as follows f(q,d)=fssi(q,d)*ft($\underline{q},\underline{d}$). Note that, according to one exemplary aspect, q contains only query terms or expanded query terms as, for example, described above with respect to FIGS. 3 and 4. The process can be repeated for each vector d. In accordance with one exemplary aspect, the variable TimeDiff ($\underline{q},\underline{d}$) could be transformed by a learned function, such as, for example, a neural network $T(x)=Tanh(\alpha*x)$, then applied as a multiplier to the original SSI score, i.e. $f(q,d)=f_{ssi}(q,d)*T(TimeDiff(\underline{q},\underline{d}))$, as noted above. The parameter a is learned through backpropagation and can be positive or negative. The time difference variable TimeDiff($\underline{q},\underline{d}$) may be transformed by a logarithmic function and then used in place of TimeDiff($\underline{q},\underline{d}$) here. The parameters in function T ( ) could be learned together with $f_{ssi}()$ using backpropagation. Alternatively, T(TimeDiff($\underline{q},\underline{d}$)) can simply be $$T(TimeDiff(q,d)) = \frac{\alpha}{TimeDiff(q,d)},$$

or T(TimeDiff($\underline{q},\underline{d}$)) can be a logarithmic function that appropriately transforms TimeDiff($\underline{q},\underline{d}$). For example, the time difference parameter can be applied as follows, where TimeDiff ($\underline{q},\underline{d}$)=log(TimeDiff($\underline{q},\underline{d}$)) and where ft(q,d)=T(TimeDiff($\underline{q},\underline{d}$)).

Alternatively, the time difference variable TimeDiff (q,d) could be employed and treated just as other words in the query q. Here, the time difference can be a special type of "word" that occupies its own entry in the vector q and the value of this word feature is the TimeDiff($\underline{q},\underline{d}$) with a specific d. Thus, the score $f_{ssi}(q,d)$ can simply be determined with a special time difference "word" in q and a particular document d, where the value of the score $ff_{sse}(q,d)$ in this case increases with a decreasing time difference TimeDiff($\underline{q},\underline{d}$). Here, the variable TimeDiff($\underline{q},\underline{d}$) can be transformed by a logarithm function first then used in place of TimeDiff($\underline{q},\underline{d}$).

At step 508, the ranker 112 can determine/rank documents based on the similarity measures f(q,d) as discussed above. For example, steps 204-210 can be performed as discussed above with respect to the method 250 of FIG. 2B. In addition, at step 510, the ranker 112 can output the ranked documents through the user interface 106 for display to a user. Further, the controller 102 can optionally perform step 210 at the end of the method 500 to continue training the model f, as discussed above. The method 500 can be repeated with the receipt of another query by the user.

As discussed above, the approaches described herein reduce rank errors, which in turn produce higher performance in terms of other metrics, such as, for example, Mean Average Precision. Expanding query terms with the terms' top-ranked items makes the query vector larger. Further, the expanded query terms are relevant to the query terms to some extent. This expanded query term vector reduces the overfitting effect when the training data is limited, which is often true when training with word features. Moreover, training on time features incorporates a time-dependent factor of a document, which is important, as many documents may lose a searcher's interest after some time. The trained time feature will optimally reweight a document by how long it has existed at the time of the query, and reduce the likelihood that obsolete documents are presented to the searcher.

Figure 7:
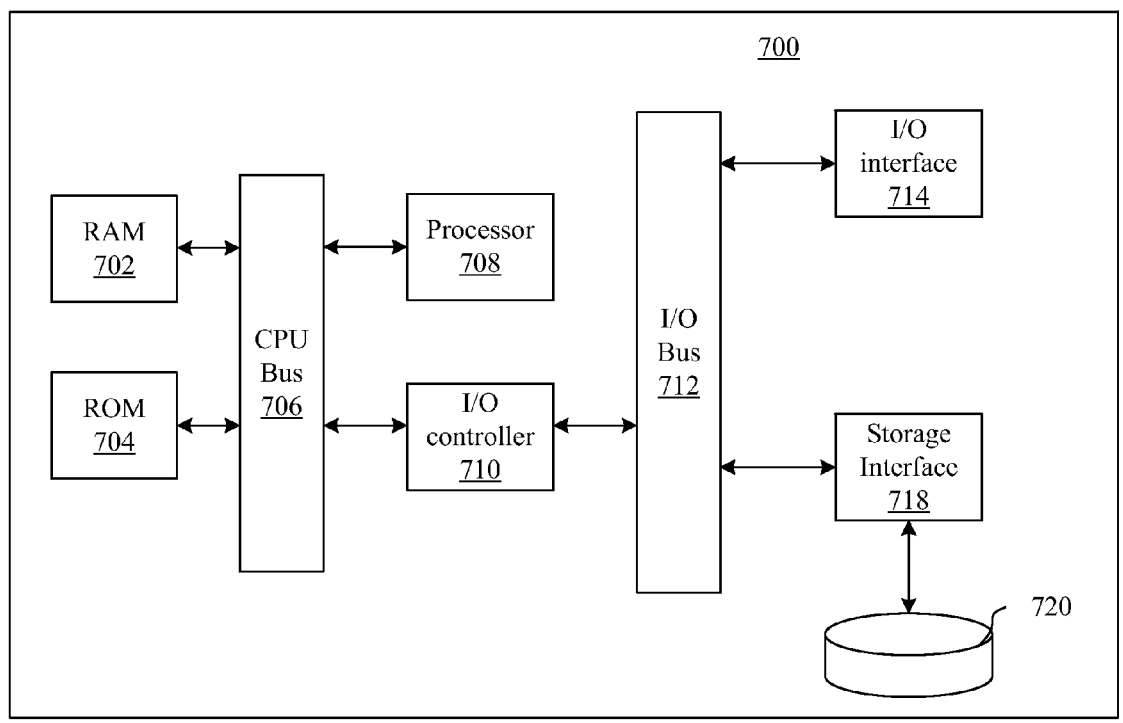
FIG. 7 is a high-level block/flow diagram of an exemplary computing system that is configured to implement method and system embodiments of the present invention.

Referring now to FIG. 7, an exemplary computing system 700 in which system embodiments of the present invention described above can be implemented, and by which method embodiments of the present invention described above can be implemented, is illustrated. The computing system 700 includes a hardware processor 708 that can access random access memory 702 and read only memory 704 through a central processing unit bus 706. In addition, the processor 708 can also access a storage medium 720 through an input/output controller 710, an input/output bus 712 and a storage interface 718, as illustrated in FIG. 7. The system 700 can also include an input/output interface 714, which can implement the user interface 106. The input/output interface 714 can be coupled to a display device, keyboard, mouse, touch screen, external drives or storage mediums, one or more external networks, etc., for the input and output of data to and from the system 700. In accordance with one exemplary embodiment, the processor 708 can access software instructions stored in the storage medium 720 and can access memories 702 and 704 to run the software and thereby implement the methods 200, 250 and 500 described above. In addition, the hardware processor 708 can, for example by executing software instructions stored on the storage medium 720, implement the system 100 and/or individual system elements described above, such as the controller 102, the search engine 108, the query generator unit 114, the similarity scoring module 110, the ranker 112 and the time difference module 116. Alternatively, each of these system elements can be implemented via a plurality of respective processors 708 in one computer system or in a plurality of different computer systems on a network. Further, the queries q, the documents d, and any of the other outputs of the systems elements of FIG. 1 can be stored in the storage medium 720.

Having described preferred embodiments of methods and systems for query generation and implementation of time difference features for supervised semantic indexing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for training a semantic indexing model comprising:
   providing a search engine with a first query;
   receiving a set of documents of a plurality of documents related to the first query from the search engine;
   generating, by at least one hardware processor, an expanded query by merging at least a portion of a subset of the set of the documents with the first query; and training the semantic indexing model based on the expanded query;

wherein the training comprises presenting at least a portion of the plurality of documents to a user, receiving indications of which of the plurality of documents are relevant to the expanded query and which of the plurality of documents are irrelevant to the expanded query;

wherein the training updates the model based on the expanded query, the documents that are relevant to the expanded query and the documents that are irrelevant to the expanded query;

wherein the updating comprises modifying the model by computing the model such that $$\sum_{(q,d^+,d^-)} \max(0, 1 - f(q', d^+) + f(q', d^-))$$

is minimized, where f is the model, q' denotes the expanded query, $d^+$ denotes documents that are relevant to the query q' and $d^-$ denotes documents that are irrelevant to the query q'.

2. The method of claim 1, wherein the method further comprises:
re-ranking the set of documents based on the expanded query using the semantic indexing model.

3. The method of claim 1, wherein the receiving further comprises selecting the subset by applying a cosine distance between a vector denoting the first query and vectors denoting the documents in the set.

4. The method of claim 1, wherein the merging comprises merging words of said subset with words of the first query that have a particular similarity to the words of the subset.

5. The method of claim 4, wherein the particular similarity is a co-occurrence based measure.

6. A system for training a semantic indexing model comprising:
search engine, which is configured to receive a first query and generate a set of documents of a plurality of documents related to the first query;
a query generator unit, implemented by at least one hardware processor, configured to generate an expanded query by merging at least a portion of a subset of the set of documents with the first query; and
a controller configured to train the semantic indexing model based on the expanded query;

wherein the training by the controller comprises presenting at least a portion of the plurality of documents to a user, receiving indications of which of the plurality of documents are relevant to the expanded query and which of the plurality of documents are irrelevant to the expanded query;

wherein the training updates the model based on the expanded query, the documents that are relevant to the expanded query and the documents that are irrelevant to the expanded query;

wherein the updating comprises modifying the model by computing the model such that $$\sum_{(q,d^+,d^-)} \max(0, 1 - f(q', d^+) + f(q', d^-))$$

is minimized, where f is the model, q' denotes the expanded query, $d^+$ denotes documents that are relevant to the query q' and $d^-$ denotes documents that are irrelevant to the query q'.

7. The system of claim 6, wherein the merging comprises merging words of said subset with words of the first query that have a particular similarity to the words of the subset.

8. The system of claim 6, further comprising:
a ranker configured to re-rank the set of documents based on the expanded query using the semantic indexing model.

9. The system of claim 6, further comprising:
a time difference module configured to determine at least one time difference parameter denoting a time difference between a receipt of the query and a generation of at least one document of the plurality of documents and to modify a similarity measure of the model based on the at least one time difference parameter.

* * * * *